E. GAUTHIER.
CLUTCH MECHANISM FOR POWER DRIVEN PUNCH PRESSES.
APPLICATION FILED SEPT. 11, 1918.
1,387,972.
Patented Aug. 16, 1921.
2 SHEETS—SHEET 1.
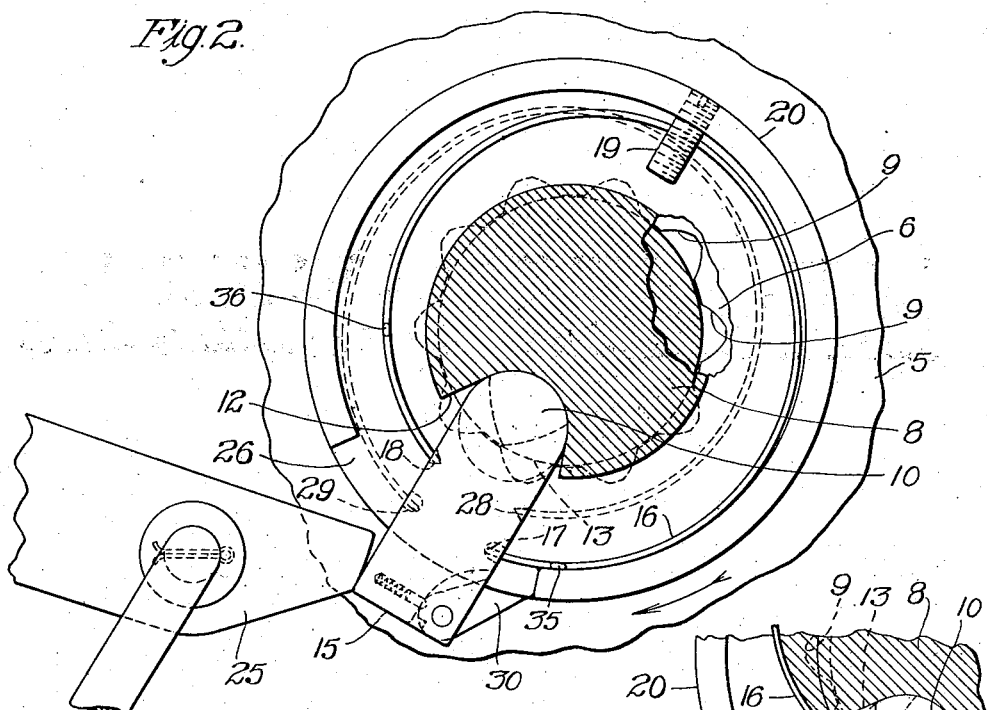
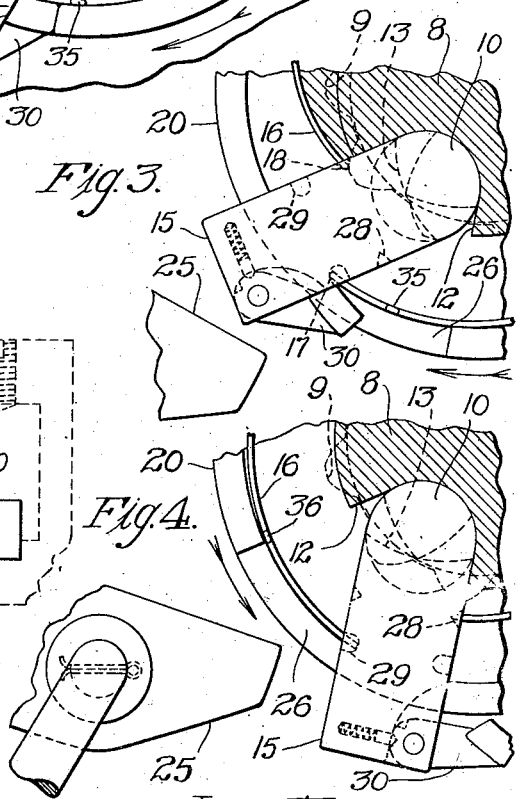
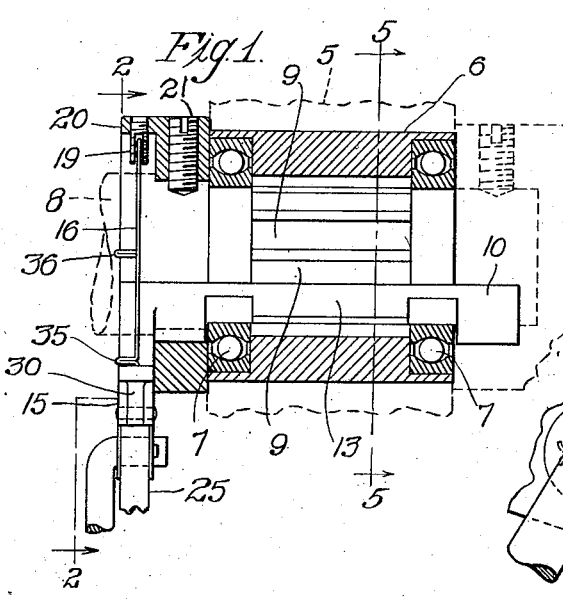
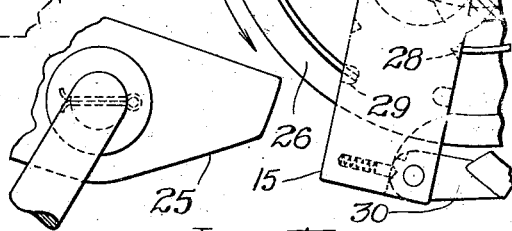
Inventor
Ernest Gauthier
by J. G. Roberts Atty.

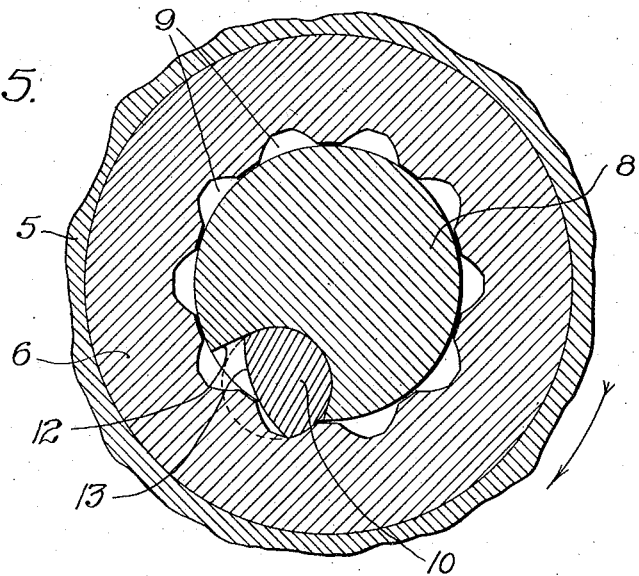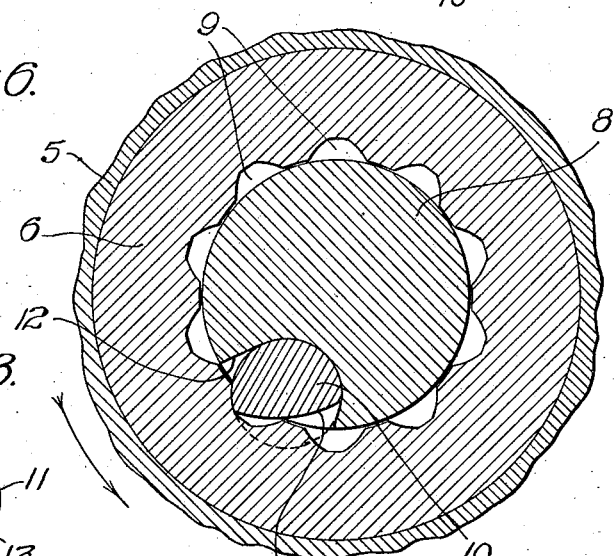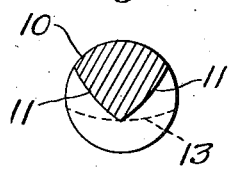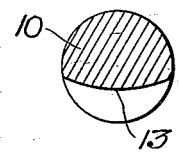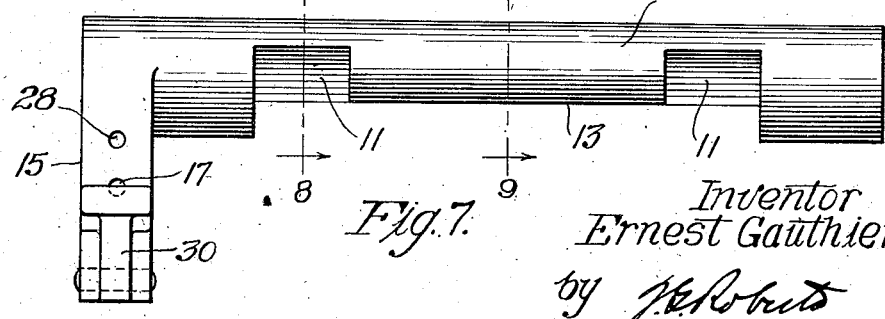

UNITED STATES PATENT OFFICE.

ERNEST GAUTHIER, OF CHICAGO, ILLINOIS, ASSIGNOR TO WESTERN ELECTRIC COMPANY, INCORPORATED, OF NEW YORK, N. Y., A CORPORATION OF NEW YORK.

CLUTCH MECHANISM FOR POWER-DRIVEN PUNCH-PRESSES.

1,387,972.  Specification of Letters Patent.  Patented Aug. 16, 1921.

Application filed September 11, 1918. Serial No. 253,546.

*To all whom it may concern:*

Be it known that I, ERNEST GAUTHIER, a citizen of the United States, residing at Chicago, in the county of Cook and State of Illinois, have invented certain new and useful Improvements in Clutch Mechanism for Power-Driven Punch-Presses, of which the following is a full, clear, concise, and exact description.

This invention relates to power driven punch presses, and more particularly to power driven presses of the roller pin and clutch type in which operative engagement between a constantly driven fly wheel and a crank shaft is brought about by means of a roller clutch pin extending through the hub of the fly wheel longitudinally of the shaft and adapted to engage bearing surfaces within the hub of the fly wheel.

The object of this invention is to improve the construction and operation of punch presses of this type whereby the life of such presses will be greatly prolonged, the operation of setting and repairing may be quickly and safely performed, and the speed of operation greatly increased without decreasing the mechanical qualities and operation of the press.

In accordance with one of the features of this invention, means are provided whereby the clutch engagement may be made practically instantaneous upon the operation of the tripping member. This is accomplished by means of a clutch sleeve located within the hub of the fly wheel and provided between its ends with a plurality of closely adjacent clutch engaging surfaces adapted to coöperate with the roller clutch pin. At its ends the clutch sleeve is provided with continuous bearing surfaces which operate in conjunction with the crank shaft to prevent undue wear upon any one portion of the bearings, thereby prolonging the life of such bearings.

In accordance with another feature of this invention, means are provided for locking the clutch pin in a neutral or safety position to prevent accidental operation of the presses during a die setting operation. In order to accomplish this the roller clutch pin is provided with a spring which normally tends to rotate this pin in a direction to complete an operative engagement between the shaft and fly wheel, which will drive the crank-shaft in the direction of the normal rotation of the fly wheel. Means are provided, however, for reversing the spring pressure on the clutch pin and for preventing its rotation in the opposite direction when this spring pressure is reversed.

In accordance with a third feature of this invention, means are provided for permitting the backing up of the punch in case it sticks in operation due to an excess amount of material being fed between the punch and the die. This is accomplished by providing engaging surfaces on the clutch collar, the opposite faces of which are precisely the same in contour, and making the roller clutch pin substantially semi-elliptical in shape so that it will engage a clutch surface when swung either to the right or to the left, thus permitting the fly wheel to be operated by hand in either direction to move the crank-shaft accordingly.

In the drawings illustrating this invention:

Figure 1 is a longitudinal cross-sectional view through the clutch ring in which the crank-shaft and fly wheel hub are indicated in dotted lines;

Fig. 2 is a transverse cross-sectional view taken upon line 2—2 of Fig. 1 and having parts broken away;

Fig. 3 is a fragmentary detailed section of the parts shown in Fig. 2 in a different position, and Fig. 4 is a view similar to Fig. 3 with the parts in a different position.

Fig. 5 is a transverse cross-sectional view taken upon line 5—5 of Fig. 1, but with the fly wheel and crankshaft shown locked together for normal operation;

Fig. 6 is a similar view showing the clutch pin in a different position for allowing the backing up of the punch;

Fig. 7 is a side elevation of the clutch pin;

Fig. 8 is a cross-sectional view taken upon line 8—8 of Fig. 7, and

Fig. 9 is a cross-sectional view taken upon line 9—9 of Fig. 7.

As shown in the drawings, 5 designates a fly wheel hub within which is tightly fitted a clutch ring 6 preferably of hardened tool steel or some similar material. At each end of this clutch ring there is inserted a ball bearing 7, one part of the race being fixed to the clutch ring, the other being carried by a crank-shaft 8. Within the interior of this clutch ring are a plurality of closely adjacent longitudinally extending grooves 9—9, the opposite faces of each groove being precisely the same in shape and contour. These grooves 9—9 terminate at the inner edges of the bearing races 7—7 and are adapted to coöperate with a roller clutch pin 10 which extends through the bearing longitudinally of the crank-shaft 8 and is located within a groove 12 provided in the crank-shaft. As shown in the drawings, particularly in Figs. 1, 7, and 8, the clutch pin 10 is cut away at each end where it passes through ball bearings 7—7 to form a triangular cross section with the curved side faces 11—11. The side faces 11—11 are formed with the same radius as the inside bearing surface of that part of the ball bearing which is carried by the crank-shaft 8 and which allows the clutch pin to be rocked in either direction. A portion 13 of the roller clutch pin 10 within the bearing sleeve 6 is semi-elliptical in cross section and is adapted to be swung either to the right or left through the agency of a crank arm 15 to engage one or the other surfaces of one of the grooves 9.

A spiral spring 16 having one end in engagement with the crank arm 15 at the point 17 and its other end in engagement with the crank arm 15 at the point 18 is fixed at its central point in a stud 19 extending through a collar 20 surrounding the crank-shaft 8 and to which it is secured by a suitable set screw 21. This spring 16 tends normally to swing the crank arm 15 to the left, as viewed in Fig. 2, but is prevented from doing so by means of a trip latch 25 which may be controlled by a foot treadle or other suitable means. When this trip latch 25 is released from engagement with the crank arm 15, however, the spring 16 in its normal position swings the crank arm 15 to the left, as shown in Fig. 3, thereby causing one face of the semi-elliptical portion 13 of the clutch pin 10 to engage the surface of one of the grooves 9—9, thereby locking the crank-shaft and the fly wheel together to cause a complete rotation of said crank-shaft.

The crank arm 15 is adapted to swing within a slot or opening 26 in the collar 20 and its swinging movement is limited by the opposite sides of this slot or opening.

When it is desired to change the die or punch of a punch press embodying the features of this invention or otherwise change its adjustment, the spring 16 may be reversed in its action by moving the end which normally bears against the crank-arm 15 at the point 17 so that it will engage a notch 28 thereon and change the opposite end of said spring to bear in a notch 29 upon the opposite side of the crank arm. In this position the spring 16 will tend to swing the crank arm 15 in the opposite direction to that which it normally swings when released by the trip member 25. This movement, however, may be prevented by means of a pivotal trigger member 30 pivoted to the crank arm 15 of the clutch pin 10 and which may be swung into position to engage one edge of the opening 26 to limit the movement of the crank arm 15 in response to the action of the spring 16 in its dotted line position as shown in Fig. 2. With the parts in this position the operator may remove punch and die with perfect safety inasmuch as the roller trip rod 10 is locked against operation and in a position in which the fly wheel is running free on the crank-shaft.

It often occurs, however, in the operation of presses of this type that a larger amount of material is fed between the die and punch than the parts are capable of handling, and this results in a sticking of the punch before it has reached or passed its dead center. Under such circumstances the obvious and easiest method of clearing this trouble is to back the punch up until the excess material can be removed. In the structure of this invention this may be easily accomplished by reversing the spring 16 into its dotted line position, as shown in Fig. 2, disconnect the power from the fly wheel, and remove the catch 30 from between the crank arm 15 and the adjacent end of the opening 26. This will permit the crank arm 15 to swing to the right, as shown in Figs. 4 and 6, and the semi-elliptical portion 13 of the roller clutch pin 10 to engage the opposite face of a groove 9 than the face it engages in the ordinary operation of the press. An operator can then, by manually operating the fly wheel in a backward direction as indicated by the arrows in Figs. 4 and 6, back the crank-shaft and punch away from the die to permit the removal of the excess metal.

The spring is provided with projecting portions 35 and 36, by means of which its position with respect to the crank arm 15 may be readily changed.

One of the principal advantages of this invention is that it permits the clutch ring being supplied with a plurality of clutch surfaces for facilitating the rapid operation of the press without reducing the bearing surface between the fly wheel and the crank-shaft. This is made possible, of course, through the particular construction of the clutch ring in which the bearing surfaces are wholly independent and outside of the interior clutch surface. Other advantages are the features of construction which make possible the reversal of the operation of the press and safeguard the operator.

What is claimed is:

1. In a power driven punch press, a constantly rotating fly wheel, a crank-shaft with which said fly wheel coöperates, a pivotally supported clutch pin for establishing an operative connection between said fly wheel and said crank-shaft, a spring normally tending to swing said clutch pin in one direction into an operative position, means for reversing the action of said spring, and means for holding said clutch pin in a neutral position when the spring is reversed.

2. In a power driven punch press, a constantly rotating fly wheel, a crank-shaft with which said fly wheel coöperates, a pivotally supported clutch pin for establishing an operative connection between said fly wheel and said crank-shaft, a crank arm carried by said clutch pin, a stationary collar having an opening in which said crank arm is adapted to swing, a spring engaging said crank arm to normally swing said clutch pin in one direction into operative position, means for reversing the action of said spring on said crank arm, and adjustable means adapted to be interposed between said crank arm and one side of said opening to maintain the clutch pin in an inoperative position.

3. In a power driven punch press, a constantly rotating fly wheel, a crank-shaft with which said fly wheel coöperates, a pivotally supported clutch pin for establishing an operative connection between said fly wheel and said crank-shaft, a crank arm carried by said clutch pin, a collar having an opening in which said crank arm is adapted to swing, a spring engaging said crank arm to normally swing said clutch pin in one direction into operative position, means for reversing the action of said spring on said crank arm, and an adjustable latch carried by said crank arm adapted to be interposed between said crank arm and one side of said opening to maintain the clutch pin in an inoperative position.

4. In a power driven punch press, a fly wheel, a crank-shaft with which said fly wheel coöperates, a clutch ring within the hub of said fly wheel having a plurality of longitudinally extending grooves the opposite faces of which are of the same shape and contour, a clutch pin extending through said ring longitudinally of the crank-shaft and having its portion within said ring of semi-elliptical cross section, and means for swinging said clutch pin in either direction into engagement with the faces of said grooves.

In witness whereof I hereunto subscribe my name this 29th day of August, A. D. 1918.

ERNEST GAUTHIER.